United States Patent
Patwardhan et al.

(10) Patent No.: US 11,093,340 B2
(45) Date of Patent: *Aug. 17, 2021

(54) SUMMARY FILE CHANGE LOG FOR FASTER FOREVER INCREMENTAL BACKUP

(71) Applicant: EMC IP HOLDING COMPANY LLC, Hopkinton, MA (US)

(72) Inventors: Kedar S. Patwardhan, Pune (IN); Suraj M. Multani, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,859

(22) Filed: Dec. 9, 2019

(65) Prior Publication Data

US 2021/0049073 A1 Feb. 18, 2021

Related U.S. Application Data

(63) Continuation of application No. 14/042,304, filed on Sep. 30, 2013, now Pat. No. 10,514,985.

(51) Int. Cl.
*G06F 11/14* (2006.01)
(52) U.S. Cl.
CPC .................. *G06F 11/1451* (2013.01)
(58) Field of Classification Search
CPC .................................................. G06F 11/1451
See application file for complete search history.

(56) References Cited

U.S. PATENT DOCUMENTS

| | | | |
|---|---|---|---|
| 6,158,019 A | 12/2000 | Squibb | |
| 7,831,789 B1 | 11/2010 | Per | |
| 8,055,613 B1 * | 11/2011 | Mu | G06F 11/1451 707/610 |
| 8,131,691 B1 * | 3/2012 | Nagaralu | G06F 16/13 707/696 |
| 8,234,317 B1 * | 7/2012 | Pogde | G06F 16/1865 707/821 |
| 2008/0059736 A1 * | 3/2008 | Murayama | G06F 11/1458 711/162 |
| 2008/0222152 A1 * | 9/2008 | Godbole | G06F 16/10 |
| 2010/0306786 A1 | 12/2010 | Passey | |

* cited by examiner

*Primary Examiner* — Apu M Mofiz
*Assistant Examiner* — Farhad Agharahimi
(74) *Attorney, Agent, or Firm* — Workman Nydegger

(57) ABSTRACT

Systems and methods for performing backups including incremental backups are provided. A change log is provided. The change log includes a map file that includes a bit for each inode in a file system. The bits are set on certain file events. The map file allows the files to be included in the next backup to be identified without having to trawl the entire file system. The change log also includes a data file that lists actual changes to the various files in corresponding records that are indexed by the inode number. The change log can enable faster incremental backups in part by eliminating unnecessary disk access requests.

14 Claims, 3 Drawing Sheets

SUMMARY FILE CHANGE LOG FOR FASTER FOREVER INCREMENTAL BACKUP

BACKGROUND

One of the many benefits of computers and computing systems is their ability to process data and to make the data useful and readily available. People want immediate access to their email, for example, and email providers implement computing systems with sufficient processing power to handle email related processing. Data is important in other contexts as well. Businesses rely on readily available data to manage product and inventories. By way of example, businesses use data, for example, to set prices, sell tickets, or manage schedules. When data cannot be accessed, there is a corresponding cost.

The inability to access data in the short term is often annoying and inconvenient. The complete loss of data, however, can have serious consequences. As a result, it is advisable to backup data. Most businesses and enterprises today have an active backup application that is protecting their data. Individual users are also beginning to protect their data.

There are different types of backup systems in use today. It has long been recognized that repeatedly performing a full backup of data can consume significant space—especially when the backups are retained over time. In an incremental backup system, for instance, the amount of data backed up is reduced because an incremental backup only backs up modifications or changes that have been made to the data since the last backup.

While this approach can minimize the amount of data that is backed up at a given time, incremental backups also have undesirable features. For example, identifying which data (e.g., which files) have changed since the last backup may require that all of the files be examined to analyze the modification time stamps. For larger systems, which may have millions of files, this can become a time consuming process and can degrade the computing performance.

More generally, conventional backup applications that support incremental backups trawl the entire file system to generate a list of modified files. This can consume significant resources as previously stated.

Instead of trawling the entire file system, some backup applications may take advantage of the file system's native change log. However, using the native change log can also result in degraded performance. This is partly related to the fact that conventional change logs are transactional in nature. Every change that occurs to a file is recorded in a conventional change log.

For example, a change log may record that a particular file is created, change a large number of times, and then deleted. Because a transactional change log records transactions for all files, the transactions associated with a particular file will be interspersed with changes to other files. During backup, all of these changes need to be processed even though the file is ultimately deleted. Consequently, the activity associated with performing a backup based on a transactional change log can also degrade the performance of the file system. More specifically, the backup operation cannot view the entire history of a file. Thus, the backup operation may encounter a new file (that was subsequently deleted) and attempt to backup that file. This results in an unnecessary disk access in part because the backup operation is only processing the create record and is unaware of the delete record.

Conventional change logs can also be very large. As previously stated, file changes are kept in a temporal order. As a result, there is a need to purge the change log at regular intervals or wrap the change log to ensure that its size does not become too large. If a situation arises where the backup application does not process the change log before it is purged or wrapped around due to size constraints, a full backup will need to be performed to ensure backup integrity. This can adversely affect the backup frequency. A system with a high change rate may require backups at frequent intervals due to concerns with the change log's size.

Another issue with conventional change logs in the context of backup operation relates to the inability to backup all modified regions of a file by reading a single record. For example, consider a situation where a file system is generating change events frequently and is creating and removing temporary files frequently. When such a change log is processed, the backup process proceeds to backup the temporary file based on the file listed in the file create event. If a path lookup is performed, it is discovered that the file is missing since the file was later removed. Unfortunately, the change log contains the file remove record at a later offset in the change log.

Because the create record and the remove record could not be obtained at the same time, the backup application had to issue a file lookup event, which can result in several physical input/output (I/O) operations to serve the file change request. This degrades the performance of the backup operation and of the physical file system. There is a need in the art for systems and methods for performing backup operations in a manner that does not degrade the performance of the backup operation or of the physical file system.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION

Figure 1:
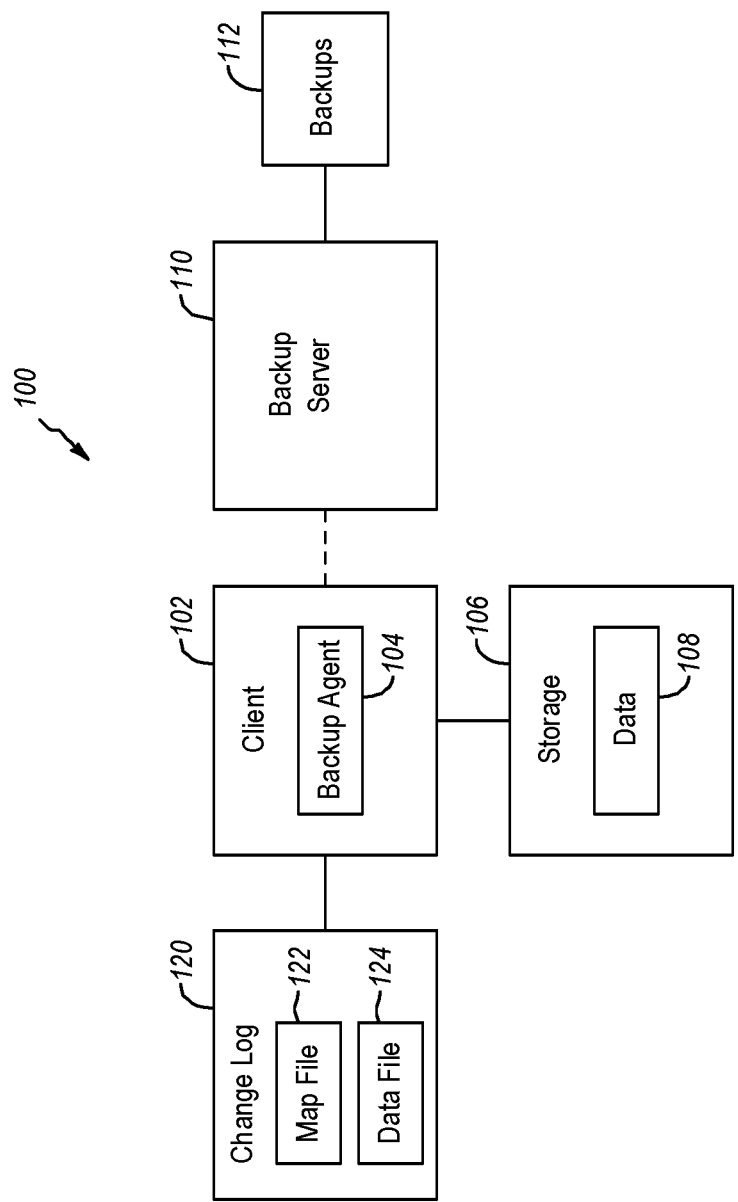
FIG. 1 illustrates an example of an environment for performing backup operations including full and/or incremental backups.

Embodiments of the invention relate to backing up data and more specifically to different types of backups and backup operations including incremental backups of data. In a backup system that uses incremental backups, there is usually at least one full backup of the data being backed up. Over time, the data changes and these changes are captured periodically as incremental backups. As a result, an incremental backup is smaller in size than a full backup of the data and can be processed more quickly.

As previously stated, however, there are aspects of incremental backups that degrade performance in conventional backup systems. Embodiments of the invention address some of these concerns by reducing or minimizing the input/output (I/O) that are performed in the course of performing or preparing for an incremental backup.

Embodiments of the invention relate to a change log or a change log that is kept and updated while the system makes changes to data. The change log can be used to identify which data (e.g., which files in a file system) should be backed up during the next incremental backup.

The change log can be configured to have a bounded size (determined, in one example, by the total number of inodes in the file system) and enables the backup process or backup operation to avoid unnecessary I/O operations (e.g., to look for files that do not exist), and reduce the amount of time needed to find a complete set of changes to a file system and to specific files since the last backup. The change log can use inode numbers, in one example, to index the change journal, or more specifically, to index records or data in the change journal.

An inode is a data structure that stores information about files or objects in a file system. An inode is associated with each file or object and is typically an integer number. The number of files that can be stored in a given system may depend on the number of defined inodes. An inode stores, by way of example and not limitation, file ownership, access mode, file type, size of the file, size of file at last backup, physical location (e.g., address of blocks on a disk), timestamps, or other metadata, or the like or any combination thereof. The implementation of inodes may vary in different operating systems.

Embodiments of the invention further relate to a change log that is associated with inodes in a file system. The change log, as discussed in more detail below, can record information about changes that occur in the file system. As a result, a complete set of changes to a file or to a file system can be quickly identified using the change log, which associates the changes in a file system with inodes.

The change log can record certain events that occur to each file in the file system. For example, if a file was created, modified, and then removed, the backup process would discover this information in the change log in the same record, regardless of the way these events occurred temporally. As a result of finding this information in the change log, the backup process does not need to generate an I/O request for a file that no longer exists. Advantageously, the performance of the backup process improves, especially compared with conventional backup systems that repeatedly issued I/O requests for data that no longer exists in the data being backed up.

FIG. 1 illustrates an example of an environment for performing backup operations including full and/or incremental backups. FIG. 1 illustrates a computing environment 100. The computing environment may include one or more servers (email servers, database servers, file servers), one or more clients (computers, smartphones, laptops, etc.), one or more storage devices (which may be associated with the clients and/or the servers or be network attached storage devices), network devices, or the like or any combination thereof. Embodiments of the invention may be implemented in a network environment including local area networks, wide area networks, cellular networks, the Internet or the like or combination thereof. Communication between device in the environment 100 may occur over one or more protocols and may involve wireless and/or wired connections.

FIG. 1 illustrates a client 102 (e.g., a server such as an email server, a database server, or the like) that is associated with storage 106. Data 108 for the client 102 is located on the storage 106. The storage 106 may be specific to the client 102 or may be accessible by other servers or clients in the environment 100. The storage may include one or more physical devices or be arranged in other manners and configurations.

For convenience, the data 108 is referred to as files, but one of skill in the art can appreciate that a file or the data or portions thereof may be stored in multiple forms that include, but are not limited to, word processing files, database records or entries, multimedia files (video, image), emails or associated data, text files, binary files, or the like or any combination thereof.

FIG. 1 further illustrates a backup agent 104 that may execute on the client 102, although the backup agent 104 may operate remotely from the client 102 in one embodiment. The backup agent 104 is configured to cooperate with a backup server 110 such that the data 108 or files are backed up and that backups of the data 108 are stored in the backups 112. In this example, the backups 112 may include full and/or incremental backups of the data 108 for the client 102. The backups 112 may also include similar backups for other clients in the environment 100. In one example, the storage 106 may be network attached storage configured to server multiple clients and the data 108 may correspond to multiple clients. In another example, the data 108 may also be associated with virtual machines, which can operate in the computing environment 106. The client 102 could be implemented as a virtual machine for example.

When performing a backup of the data 108 or files, the backup agent 104 may use a change log 120. In one example, the change log 120 may include information relating to more than one file and may be configured itself as files. In FIG. 1, the change log 120 includes a map file 122 and a data file 124.

In one example, the change log 120 is formatted such that the size of the change log 120 is bounded. This is achieved in part by associating the change log with inodes. As a result, the size of the change log 120 is bounded by number of inodes in a given file system or by the potential number of inodes in use. In one example, the change log 120 may be a sparse file. In one example, the map file 122 is a bitmap file that is a bitmap for each inode number that was modified in the file system since the last backup of the file system. For example, if inode number 0x454fd mas modified, then the bitmap file 122 would contain a 1 for the 0x454fd$^{th}$ bit in the bitmap file 122.

The other file in the change log 120 is a data file 124. The data file 124 may identify the actual changes that happen to each inode (file) in the file system. For each file or for each file that may be backed up in the next backup, the data file 124 may contain metadata. For example, the data file 124 may store the old file name, the new file name, inode number (which can be used to index the inode-records), the file modification event (create, modify, remove, set attribute, etc.), file size, or the like or combination thereof in a record for a given file. In one example an inode or a file is associated with a record in the data file 124, which may also be accessed according to the inode number.

For example, if a file in the file system (e.g., storage 106) is removed, a bit corresponding to the file's inode will be set in the map file 122 of the change log 120. The data file 124 would contain the full file name (in an old file name section of the inode-record of the data file 124) to indicate the name of the file that was removed. The event (file removal or deletion) would be reflected in the inode record of the data file 124.

If a file is created in the file system, then a bit corresponding to the file's inode is set in the map file 122 of the change log. The data file 122 will contain a record indicating the new name of the file's inode number.

If a file is modified in the file system, the data file 124 contains a flag (or other metadata) indicating that the file was modified along with the file name in the-inode-record for that file. This can be accomplished, in one example, by ensuring that the inode-records are stored in the data file 124 indexed by inode number. The inode-records in the inode-data file 124 may be of a fixed length.

The change log 120 is configured such that all modifications to an inode-number are maintained at one location in the inode-data file 124. This enables a backup application (e.g., the backup agent) to read one inode record in the inode-data file 124 to know everything about the file.

For example, if a file was created, modified, and then removed since a most recent backup, the backup agent would find a bit set for the inode number of the file in the map file 122. The backup agent would then index into the inode-data file 124 and read the inode-record, which would contain information indicating that the file was created, modified and removed. As a result of obtaining this information, no I/O request would be made for a file that does not exist. A conventional change log, for example, would indicate a create event for a file. The remove event is much later in the conventional change log. This would cause an I/O request for a file that does not exist in a conventional system.

As a result of the change log 120, the backup 104 no longer issues a lookup request for a file that has been removed. In addition, the size of the change log 120 is limited to the largest inode number present in the file system. Since file system reuse inode numbers, the size of the change log 120 is thus limited.

In one example, the inode-bitmap file 122 and the inode-data file 124 are instantiated as sparse files that do not need to be regularly purged and that do not wrap around.

Figure 2:
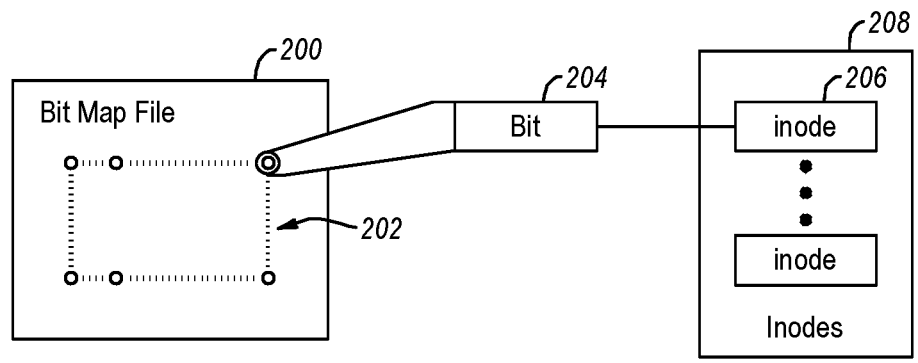
FIG. 2 illustrates an example of a map file that is included in a change log used in performing backup operations.

FIG. 2 illustrates an example of a map file 122 that is included in a change log 120 FIG. 2 illustrates an inode-bitmap file 200, which is an example of the map file 122 used in performing backup operations. The file 200 includes a plurality of bits that can be set to 0 or 1. The bits 202 in the file 200 correspond to inodes. In other words, the bits 202 in the file 200 correspond to all inodes in a particular file system in one example. There be a single bit per inode or multiple bits per inode.

The bit may be set when an event occurs with respect to a file. The details of the event may be found in the data file 124. In this example, each entry in the inode-bitmap file 122 that is set reflects a file event (e.g., create, modify, remove, set attribute, etc.) that occurred since the last backup. The inode-data file 124 lists the actual changes or the file events. However, it may not be necessary to record every event in the inode-data file. For example, writes to a newly created file could be omitted since the file's status as newly created will cause the file to be included in the next backup. By accessing the inode-data file 124 using the inode-bitmap file 122, the backup agent can identify which files in the file system have been modified. The details can be found by examining the corresponding entry in the inode-data file 124. The inode-bitmap 122 can be purged and all bits reset after an incremental backup. Alternatively, a separate inode-bitmap could be used for the next backup. Thus, when a backup is initiated, the system may switch to another inode-bitmap file. However, the inode-data file does not need to be purged as frequently because all changes since the most recent backup can be identified using the inode-bitmap file 122.

Figure 3:
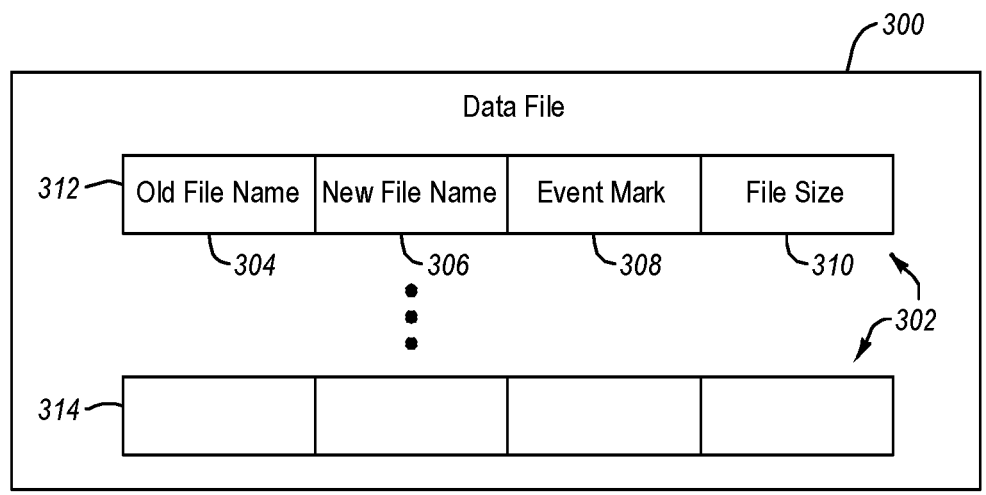
FIG. 3 illustrates an example of a data file that is included in a change log used in performing backup operations.

FIG. 3 illustrates an example of an inode-data file 300 that is included in a change log used in performing backup operations. The inode-data file 300 is an example of the data file 124.

The inode-data file 300 includes one or more records, illustrated as records 302. Records 312 and 314 are examples of records in an inode-data file 300. In one example, there is a one to one correspondence between the number or records 302 in the inode-data file 300 and the number of inodes in a system. As a result, the size of the inode-data file 300 is bounded by the number of inodes and the inode-data file is not susceptible to becoming too large and does not need to wrap around like a conventional change log. In addition, the inode-data file 300 may be a sparse file, which further conserves on space. The inode-data file 300 can also be purged in certain circumstances, such as after a backup operation. Alternatively, the system may switch to a different (e.g., new inode-data file) once a backup operation is initiated.

The record 312 in the inode-data file 300 includes fields that store, by way of example and not limitation, an old file name 304, a new file name 306, an event mask 308, a file size 310, or the like. The old file name 304 may be used to store the name of an inode that was deleted. In other words, when a file is removed, the full name of the file is stored in the old file name 304.

When an inode is reused or created, the name of the file that owns the inode of that corresponds to the inode is stored in the new file name 306. The event mask 308 denotes a set of operations that were performed against the inode. These events may be listed in chronological order in one example. The file size 310 is used to store the size of the file at the time of the last backup. This field can be used to track appending writes to the file.

An example of an inode record 312 may be as follows:

Old File Name: /mnt1/dir1/file1
New File Name: /mnt1/dir3/file4
Event Mask: DELETE | CREATE | SETATTR
Last Backup Size: 0
Inode Number: 0x454fd The interpretation of the record 312 may be that the file was originally /mnt1/dir1/file1, but has been removed. This is reflected in the DELETE record in the event mask. Later, the inode (number 0x454fd) was reused for a new file named /mnt1/dir3/file4, which explains the CREATE record in the event mask. Subsequently, the owner and permissions of the file were changes, which explains the SETATTR record in the event mask. The last backup size is 0 since the file is new at least relative to the most recent backup.

Figure 4:
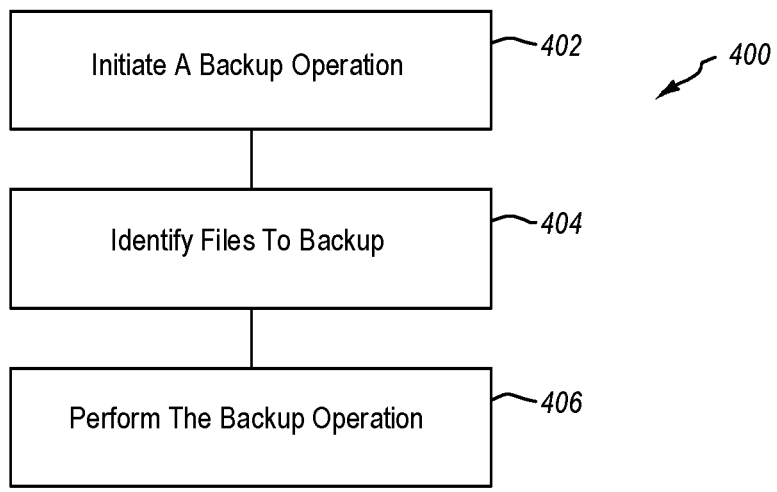
FIG. 4 illustrates an example of a flow diagram of a method for performing a backup operation in a computing environment.

FIG. 4 is a flow diagram of a method for performing a backup operation in a computing environment (e.g., a client or a file system). The method 400 begins when a backup operation is initiated in box 402. A backup operation can be initiated automatically by the backup agent, the backup server, by a user, or the like. When performing an incremental backup, the backup operation may be initiated according to a predetermined schedule.

In box 404, the files (or data) to be backed up is identified. The identification of files to be backed up can be performed by accessing the change log. In one example, the inode-bitmap file in the change log identifies the files that have changed. For events that resulted in a need to backup a file (or a portion of the file), a bit was set in the inode-bitmap file. In context, the inode-bitmap file includes a bit for every inode in the file system and those whose bits are set should be backed up in the upcoming backup operation.

The inode-bitmap file can serve as an index to an inode-data file that is also used during the backup operation. While the inode-bitmap file can identify the specific files, the inode-data file can identify the events that occurred with the file and enable the backup agent to determine how the file should be backed up. If a file has been created since the last backup (which can be determined from the event mask in the inode-record in the inode-data file for the specific file), then the entire file is backed up. Appends may result in part of a file being backed up. Deletions may result in a file being removed from the backup. Advantageously, each inode-record presents the history of events that have occurred since the last backup and each inode-record enables the corresponding file to be handled appropriately. In addition, performance is improved because unnecessary file access requests are avoided.

In box 406, the backup operation is performed. In one example, the inode-bitmap is purged and all bits are reset. The inode-data file may be a sparse file and does not need to be purged as frequently because for a given backup, only inode-records associated with set bits in the inode-bitmap file are considered during the backup operation.

Figure 5:
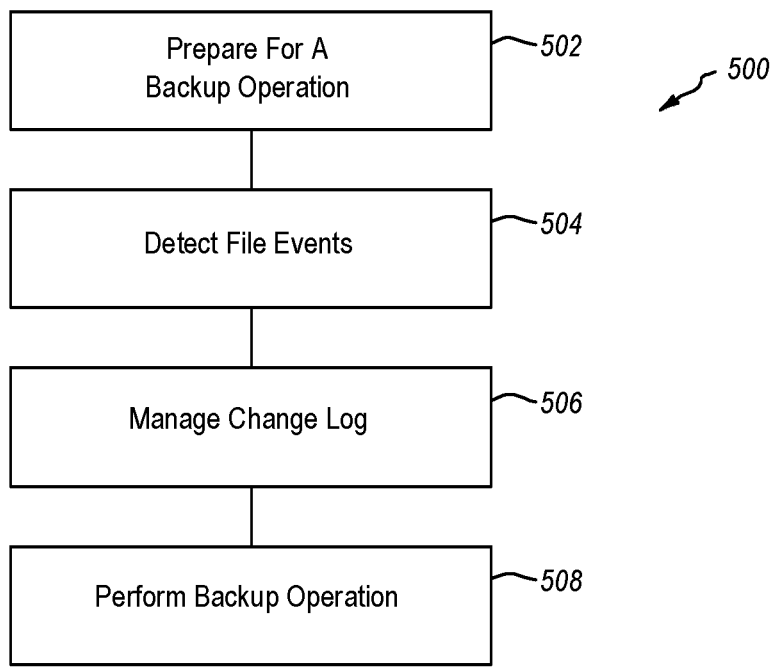
FIG. 5 illustrates an example of a flow diagram for performing a backup operation or of preparing for the backup operation.

FIG. 5 illustrates an example of a flow diagram for performing a backup operation or of preparing for the backup operation. In block 502, preparation for a backup operation is performed. This may occur after a recent backup operation has concluded and may include purging part of a change log as necessary.

In block 504, file events are detected and in block 506, a change log is managed. The acts or steps in blocks 504 and 506 can occur concurrently. For example, the change log is managed as file events are continually detected. In order to detect file events, the method 500 may rely on notifications from a layered file system, which may be positioned above a physical file system. All file events pass through or are detected by the layered file system and can be reported and processed. In block 504, for example, a create file event may be detected. The create file event is processed and the change log is managed in block 506 by making an entry in the change log. The entry may set a flag in the inode-bitmap file to identify the file as one that should be backed up in the next backup. An inode-record may also be created in the inode-data file that reflects the create event as discussed herein. As additional file or data events are detected, the change log is managed. In some instances, a file event may not result in a change to the change log. For example, a write that appends to a file that was created since the last backup does not necessarily result in an entry in the corresponding inode-record in part because it is enough to know that the file should be backed up. However, a remove event will result in a change to the inode-record. When the inode-record is processed by the backup agent, the backup agent can determine from the inode-record that the file no longer exists and no file access request will be made.

In block 508, the backup operation is performed. This can include, by way of example, accessing the change log. For instance, the inode-bitmap may be accessed to generate a list of files (or portions thereof) to include in the next backup. The inode-data file may be processed for each file in the list to determine the current state of the file. As discussed herein, the file may have been removed and there is no longer a need to back up the file in the next backup. The change log enables the backup operation to be performed more efficiently and can improve performance by eliminating unnecessary disk access requests.

Embodiments of the present invention may comprise or utilize a special purpose or general-purpose computer including computer hardware, such as, for example, one or more processors and system memory, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup of a file system in a computing system, the method comprising:
   maintaining a change log for the file system, wherein the change log includes events that occur to files in the file system that have changed since a most recent backup, wherein the change log includes a bitmap and a data file, wherein the bitmap includes an entry for each file in the file system and the data file includes a record of entries for each file, each entry corresponding to an event;
   detecting the events in the file system and processing the events to determine whether files associated with the events are modified, wherein at least some of the events that modify the files do not result in an entry in the change log, and wherein at least some of the events result in an entry in the bitmap file but not in the data file;
   identifying files in the file system to include in the backup operation by accessing the change log;
   for every file in the change log that has changed since the most recent backup, determining whether to perform the backup operation for the file based on the associated events of the file in the change log; and
   performing the backup operation on the file system by backing up only the files whose associated events indicate that backup is required, wherein disk accesses for files that do not require backup based on the associated events are avoided.

2. The method of claim 1, further comprising creating the entries when the events are detected for the files.

3. The method of claim 1, further comprising accessing the bitmap file to generate a list of files to be included in the backup operation, wherein the backup operation is an incremental backup operation.

4. The method of claim 3, further comprising processing all events associated with a file before determining whether to perform the incremental backup operation.

5. The method of claim 4, further comprising removing files from the list that do not need to be included in the incremental backup operation.

6. The method of claim 1, wherein the file system includes inodes and each of the files is associated with one of the inodes, wherein the bitmap file and the data file are based on a number of inodes in the file system.

7. The method of claim 1, wherein the record includes one or more of an old file name, a new file name, an event mask, a file size, and an inode number.

8. A non-transitory computer readable medium comprising computer executable instructions configured to be executed by a processor to implement a method for performing a backup of a file system in a computing system, the method comprising:
   maintaining a change log for the file system, wherein the change log includes events that occur to files in the file system that have changed since a most recent backup, wherein the change log includes a bitmap and a data file, wherein the bitmap includes an entry for each file in the file system and the data file includes a record of entries for each file, each entry corresponding to an event;
   detecting the events in the file system and processing the events to determine whether files associated with the events are modified, wherein at least some of the events that modify the files do not result in an entry in the change log, and wherein at least some of the events result in an entry in the bitmap file but not in the data file;

identifying files in the file system to include in the backup operation by accessing the change log;

for every file in the change log that has changed since the most recent backup, determining whether to perform the backup operation for the file based on the associated events of the file in the change log; and performing the backup operation on the file system by backing up only the files whose associated events indicate that backup is required, wherein disk accesses for files that do not require backup based on the associated events are avoided.

9. The non-transitory computer readable medium of claim 8, the method further comprising creating the entries when the events are detected for the files.

10. The non-transitory computer readable medium of claim 8, the method further comprising accessing the bitmap file to generate a list of files to be included in the backup operation, wherein the backup operation is an incremental backup operation.

11. The non-transitory computer readable medium of claim 10, the method further comprising processing all events associated with a file before determining whether to perform the incremental backup operation.

12. The non-transitory computer readable medium of claim 11, the method further comprising removing files from the list that do not need to be included in the incremental backup operation.

13. The non-transitory computer readable medium of claim 8, wherein the file system includes inodes and each of the files is associated with one of the inodes, wherein the bitmap file and the data file are based on a number of inodes in the file system.

14. The non-transitory computer readable medium of claim 8, wherein the record includes one or more of an old file name, a new file name, an event mask, a file size, and an inode number.

* * * * *